A. G. TAYLOR.
ELECTRIC CURRENT COLLECTOR.
APPLICATION FILED NOV. 22, 1918.
1,322,371.  Patented Nov. 18, 1919.
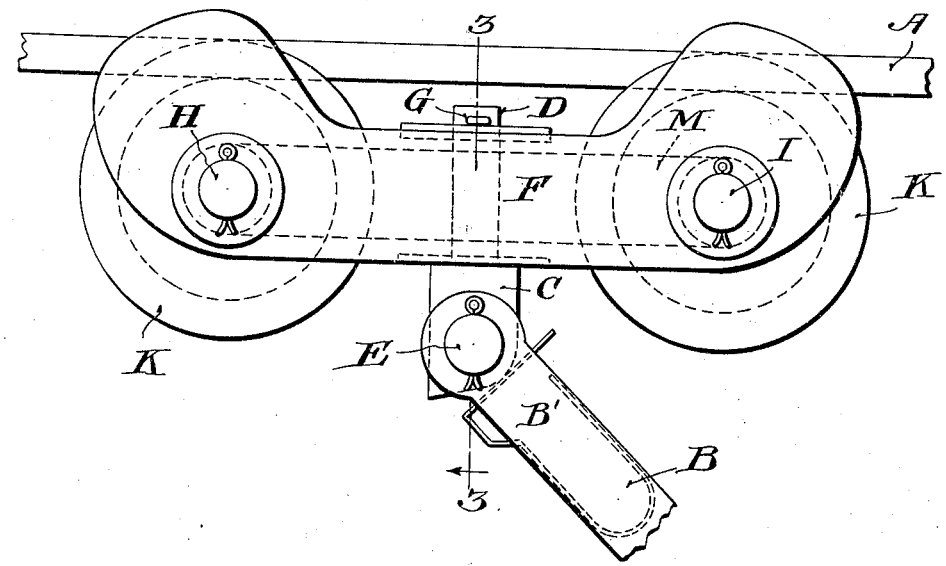
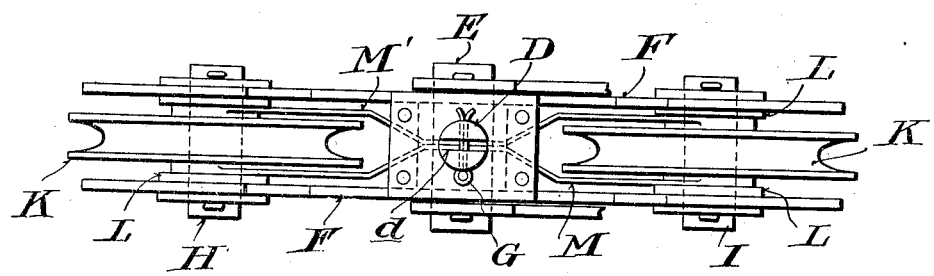
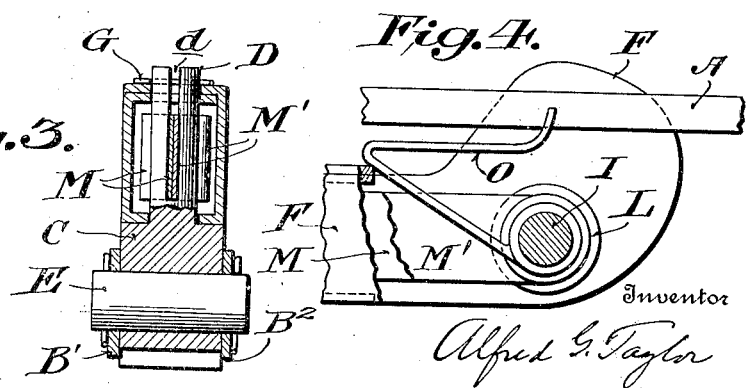

UNITED STATES PATENT OFFICE.

ALFRED G. TAYLOR, OF GREENVILLE, SOUTH CAROLINA, ASSIGNOR TO JAMES R. AIKEN.

ELECTRIC-CURRENT COLLECTOR.

1,322,371.     Specification of Letters Patent.     Patented Nov. 18, 1919.

Application filed November 22, 1918. Serial No. 263,782.

*To all whom it may concern:*

Be it known that I, ALFRED G. TAYLOR, a citizen of the United States, and residing at Greenville, county of Greenville, State of South Carolina, have invented certain new and useful Improvements in Electric-Current Collectors, of which the following is a specification.

The present invention relates to improvements in electric current collecting devices and particularly to an improvement upon the structure heretofore patented by me on January 2, 1917, No. 1,211,006.

The particular object of the present improvements is to provide means by which lateral deflection or turning of the conductor engaging means will be more uniformly resisted and the action of the trolley rendered superior to that shown in the patent referred to.

The improvements also provide additional current conducting means between the wheels and pole of the trolley.

In the accompanying drawings:

Figure 1 is a side elevation of the improved device, showing the same in contact with a trolley wire;

Fig. 2 is a plan of the device;

Fig. 3 is a sectional view of the line 3—3 of Fig. 1; and

Fig. 4 is a detail view showing a device for removing ice from the trolley wire which may be substituted for one of the wheels shown in Figs. 1 and 2.

While the stationary conductor with which the improved collecting device is adapted to coöperate may be either a rail or a wire, the embodiment of the invention illustrated is particularly adapted for use with overhead conducting wires and such a conductor is represented at A in the drawing.

The trolley pole B, as in the patented structure is provided at its upper end with the usual harp or spaced members $B^1$, $B^2$, between which is fitted the rectangular shaped base or lower portion C of the stem D that extends upwardly from the pole in a normally substantially vertical direction. The base of the stem D and the members of the harp at the upper end of pole B are connected by a pivot pin E so that said stem may rock about a substantially horizontal axis relative to the pole.

As in the earlier construction the stem D extends through the bottom and top plates of a frame F and said frame is held against the enlarged base C by means of a cotter pin G.

Axles H, I, are mounted in the sides of the frame F adjacent the ends thereof and on opposite sides of the stem D and on said axles, in the embodiment of the invention shown in Figs. 1 and 2, are mounted trolley wheels K.

As shown, the rounded portion of the stem D about which the frame F is adapted to turn as an axis, is provided with a slot $d$ that opens through the upper end thereof. Within said slot are arranged two flat springs M, M', the ends of which embrace the axles H, I, and contact with the hubs of the conductor engaging wheels K. The ends of said springs are separated from the sides of the frame F by washers L and said springs are so shaped or bowed that while they permit a yielding or turning movement of the frame relative to the stem D, they act to maintain the collector as a whole in alinement with the conductor.

The conductor engaging devices of the collector are shown in Figs. 1 and 2 as being wheels or rollers. If desired, however, one of such wheels may be replaced by an ice clearing member C as shown in Fig. 4. This comprises a hub-like member fitted about the axle I between the ends of the springs M, M', and a plate-like extension which extends upwardly and rearwardly into contact with the top plate of the frame F and is then bent forwardly having its free end curved upward and slightly grooved so that it will bear close against the under side of the conductor A.

The operation and advantages of the improvements will it is thought be readily understood from the drawings in connection with the foregoing description. It will be seen that the springs M, M' contacting with both faces of the conductor engaging devices will act to conduct a maximum amount of current from such devices to the pole and the form of such springs will act to maintain the collector in substantial parallelism with the conductor and resist accidental turning of the frame F about the stem D.

Having thus described the invention what is claimed is:

1. In a current collecting device, a trolley pole, a stem pivotally mounted on the pole, a frame rotatable about the stem, two conductor engaging devices mounted in the frame on opposite sides of the stem, and two leaf springs each having an intermediate bowed portion engaging the stem, the corresponding ends of the springs bearing against opposite sides of the conductor engaging devices.

2. In a current collecting device, a trolley pole, a stem extending substantially vertically from the pole, a frame mounted to turn about the stem as an axis, two axles carried by the frame on opposite sides of the stem, trolley wheels mounted on said axles, two leaf springs each having its ends embracing the axles, the corresponding ends of the springs being on opposite sides of the trolley wheels and bearing thereagainst, and an intermediate bowed portion engaging the stem.

3. In a current collecting device, a trolley pole, a stem extending substantially vertically from the pole, a frame mounted to turn about the stem as an axis, two axles carried by the frame on opposite sides of the stem, two leaf springs each having its ends embracing the axles and an intermediate bowed portion extending through the stem, and a conductor engaging device on each axle between said springs.

4. In a current collecting device, the combination of a trolley pole, a stem rising substantially vertically from the pole, and having a slot extending through its outer end, a frame adapted to turn about the stem as an axis, two conductor engaging devices mounted in the frame on opposite sides of the axis, and two leaf springs extending through the slot in the stem and having their ends bent to bear laterally against the conductor engaging devices.

5. In a current collecting device, the combination of a trolley pole, a stem rising substantially vertically from the pole, and having a slot extending through its outer end, a frame adapted to turn about the stem as an axis, two axles arranged in the frame on opposite sides of the stem, a conductor engaging device mounted on each axle, and two leaf springs each having its ends embracing the axles and bearing against the conductor engaging device thereon and an intermediate bowed portion extending through the slot in the stem.

In testimony whereof I affix my signature.

ALFRED G. TAYLOR.